Aug. 4, 1959   F. G. THANNHAUSER   2,897,685
CONTROL APPARATUS FOR VEHICLE TRANSMISSION
Filed Feb. 6, 1956   2 Sheets-Sheet 1
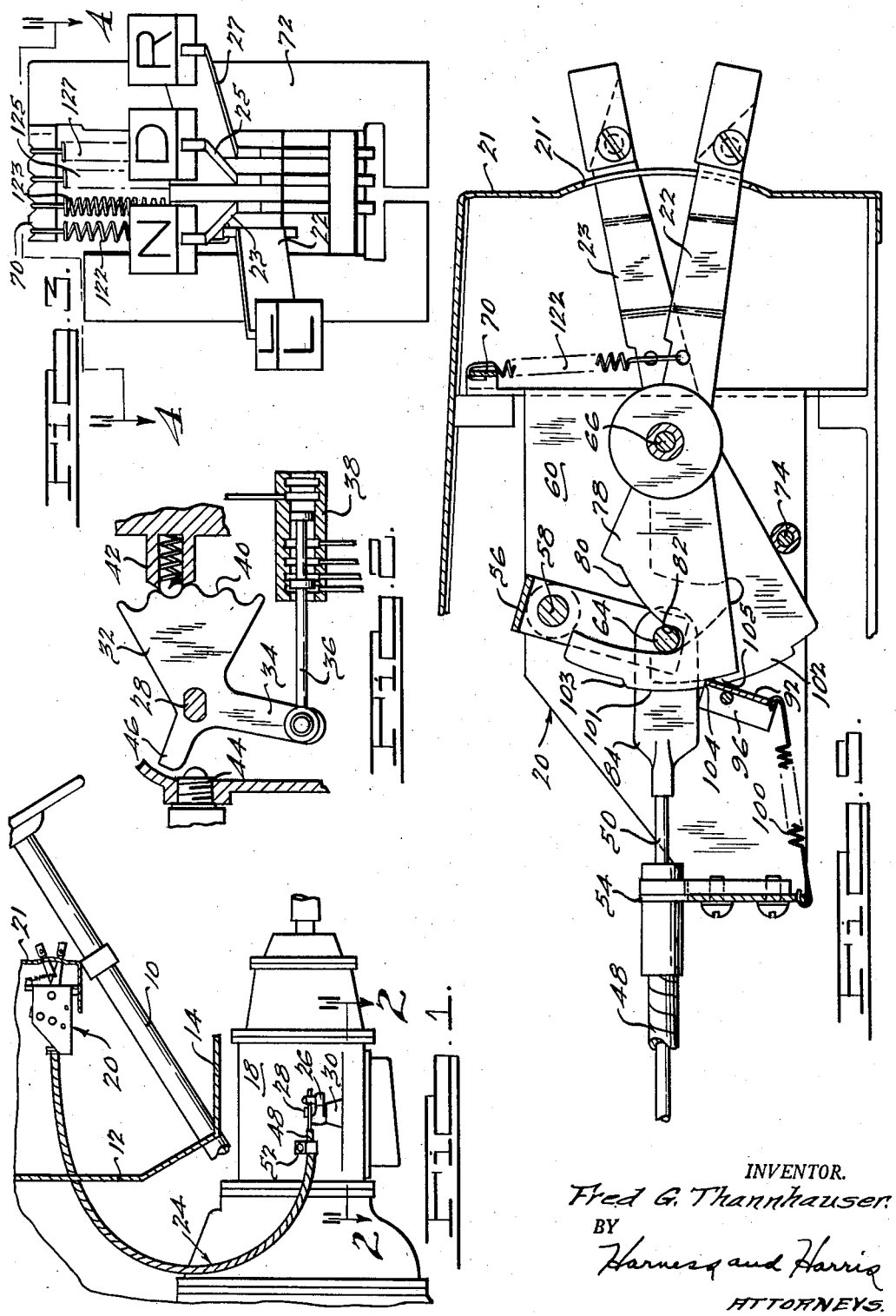
INVENTOR.
Fred G. Thannhauser
BY
Harness and Harris
ATTORNEYS.

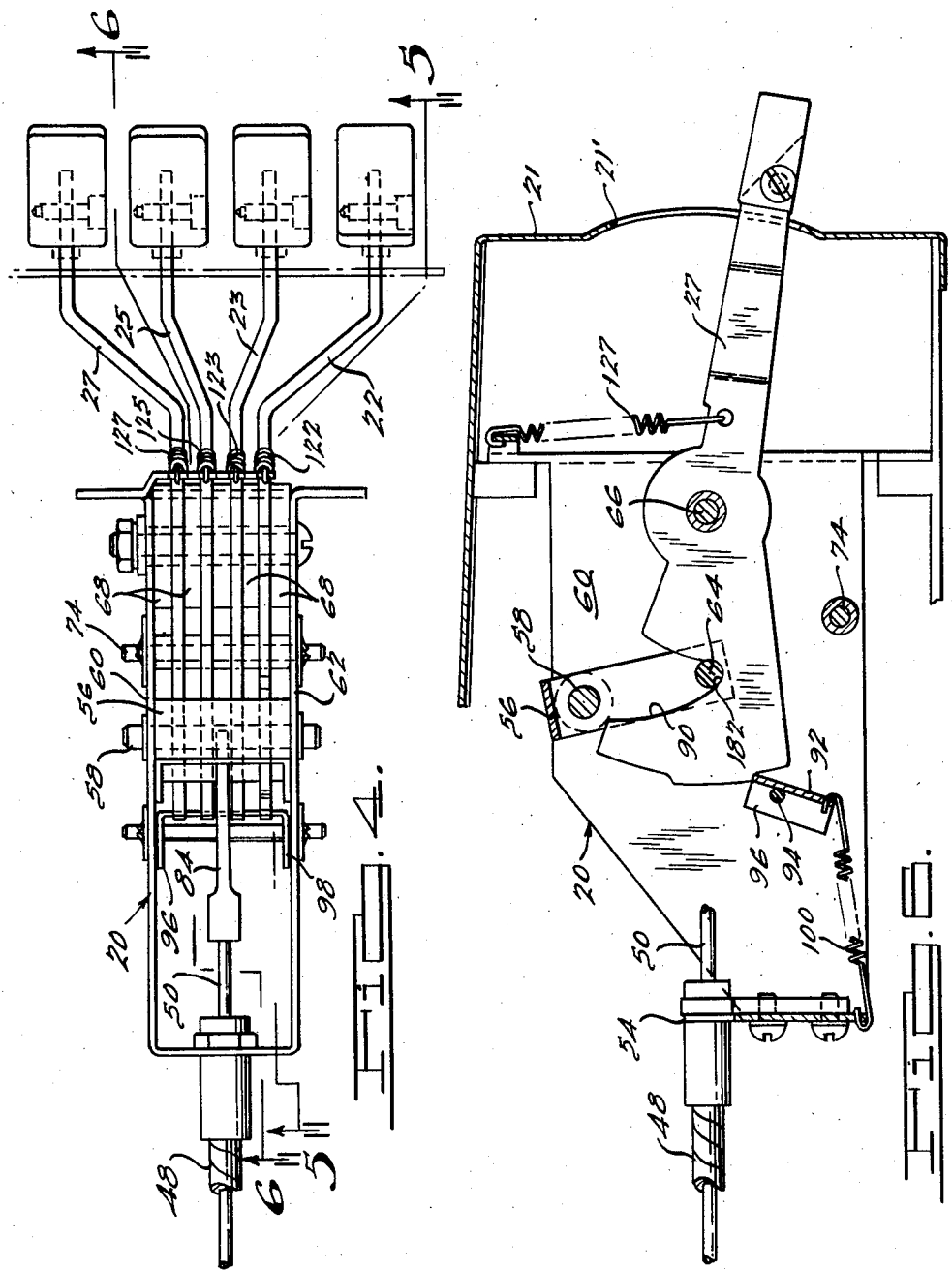

United States Patent Office 2,897,685
Patented Aug. 4, 1959

2,897,685

CONTROL APPARATUS FOR VEHICLE TRANSMISSION

Fred G. Thannhauser, Royal Oak, Mich., assignor to Chrysler Corporation, Highland Park, Mich., a corporation of Delaware Application February 6, 1956, Serial No. 563,468

6 Claims. (Cl. 74—473)

This invention relates to transmission control apparatus and has particular reference to apparatus in the general category of the push button variety used to effect selective operation of a motor vehicle transmission.

More particularly, the invention relates to the variety of push button controls generally referred to as the piano key type. The apparatus to be described herein is adapted for use in combination with a transmission control apparatus of the type illustrated and described in Jeremy T. Ball patent application, Serial No. 477,870 filed December 27, 1954. The transmission described in the above application is representative of some current commercial transmissions to the extent that a hydraulic control system for the transmission is regulated by movement of a single valve.

The principal objects of the invention are to provide improved single motion transmitting devices which are readily and easily operable and which are economically and easily manufactured.

Other objects and advantages of the invention will become more apparent from the following description of one embodiment of my invention, reference being had to the accompanying drawings in which:

Fig. 1 is a fragmentary side elevation of a portion of a motor vehicle incorporating the transmission control apparatus to be described herein.

Fig. 2 is a fragmentary horizontal sectional view taken on the line 2—2 of Fig. 1.

Fig. 3 is a front elevational view of the control box with the escutcheon plate removed.

Fig. 4 is a plan view of the control box as viewed in the direction of the arrows 4—4 in Fig. 3.

Fig. 5 is a sectional view taken on the lines 5—5 in Fig. 4 showing the "Low" lever depressed and the "Neutral" lever unapplied.

Fig. 6 is a sectional view taken on the line 6—6 of Fig. 4 and showing the "Reverse" lever depressed.

In Fig. 1 a portion of a motor vehicle is illustrated as including a steering column 10, a fire wall 12, a floor pan 14, and a transmission 18. A control box 20 is supported on the instrument panel by an escutcheon plate 21 and is illustrated as provided with a plurality of selectively operable levers 22, 23, 25 and 27 protruding therefrom. The escutcheon plate 21 is provided with a plurality of vertically extending aligned slots such as at 21' in Fig. 6 to accommodate the levers 22, 23, 25 and 27. A single cable 24, which is preferably of the Bowden wire type, operatively connects the control box 20 and a lever 26 carried by the transmission 18.

The lever 26 is keyed to a vertically extending shaft 28 which extends into the interior of the transmission and is rotatably mounted in a boss 30 carried by the casing of the transmission. A lever plate 32 is mounted on shaft 28 for rotation therewith within the casing of the transmission. The lever plate 32 is provided with a laterally extending finger 34 which is operatively connected to a movable element 36 of a drive ratio selector valve 38. The drive ratio selector valve 38 is adapted to control the hydraulic control system of a transmission in the manner described in Jeremy T. Ball patent application, Serial No. 477,870 which was filed December 27, 1954 and reference may be made thereto for a description of the hydraulic control system and the operative components of the transmission 18.

The rotatable lever plate 32 is preferably provided with a plurality of serrations 40 which are engaged by a spring detent mechanism 42 to retain the lever plate 32 in predetermined positions corresponding to different drive ratio positions of the movable element 36 of the drive ratio selector valve 38. If desired, a switch 44 carried by the casing of the transmission 18 may be provided for cooperation with a finger 46 carried by the lever plate 32. The switch 44 is wired into the electric circuit controlling the engine starter so that the engine can be started only when the transmission is in neutral.

The cable 24 includes an outer sheath 48 and an inner wire 50 which is movable longitudinally of the sheath 48. The wire 50 is secured to the lever 26 on the transmission 18 and the sheath 48 is secured at 52 to a stationary component of the vehicle such as the casing of the transmission 18. The other end of the cable 24 is connected to the control box 20 with the sheath 48 secured to a fixed extension 54 carried by the control box 20. The wire 50 of the cable 24 extends into the control box 20 for connection to mechanism therein in a manner to be described herein.

Referring to Figs. 3 through 6 of the drawings it will be seen that the control box 20, which is mounted on the instrument panel has four selectively operable push button levers protruding from the front face thereof. The push button levers correspond to different settings of the transmission and have been illustrated as carrying the markings corresponding to Low, Neutral, Drive and Reverse. It is to be understood that additional push buttons could be used without departing from the invention if desired.

The mechanism within the control box 20 comprises a rotatable output or rocker member 56 which is of an inverted U-shaped configuration and which is rotatably secured adjacent the bite end by pin 58 between side walls 60 and 62 of the box 20. A control pin 64 is connected between the free ends of rocker member 56 and it is this pin which transmits the movement from the levers 22, 23, 25 and 27 to the wire 50. The last mentioned levers are pivotally mounted by bolt 66 and spacers 68 between walls 60 and 62 of the box 20. The levers are flat and straight with the exception that they are bent when they leave the box 20 to accommodate proper spacing of buttons marked "L," "N," "D," and "R" which are attached to the free ends thereof. As shown more particularly in Fig. 3, each of the levers 22, 23, 25 and 27 are provided with coil springs 122, 123, 125 and 127, respectively, for biasing the levers in a counterclockwise direction as viewed in Figs. 5 and 6. The springs are connected between the levers and a fixed arm 70, the latter being formed integral with a front wall 72 of the side wall 60. A stop pin 74 which is connected between the side walls 60 and 62 serves to limit the counterclockwise movement of the levers 22, 23, 25 and 27 and serves in cooperation with the springs 122, 123, 125 and 127 to hold the levers in their unapplied positions as, for example, lever 23 in Fig. 5.

The portion of each lever 22, 23, 25 and 27 to the left of the pivot bolt 66 as viewed in Figs. 5 and 6 is identical with each other lever with one exception. This exception is a V-type slot which each lever contains. For the purpose of simplicity, the following description will be directed to the lever 22 which is in its applied position as shown in Fig. 5.

The lever 22 is provided with a generally triangular portion 78, the upper edge of which has a V-shaped slot 80 extending downwardly therefrom. The base of the slot 80 provides a seat 82 which receives and positions the control pin 64. The pin 64 is attached to the cable wire 50 by a connection 84, the latter being positioned between the triangular ends of the levers 23 and 25. The entrant dimension of the slots in all of the levers is the same and the slots vary only as to the camming side surfaces of each which terminate in the control pin slots such as at 82 for lever 22 and at 182 for lever 27 in Fig. 6. The seat in the slot on each of the levers positions the control pin at a different position consequently effecting a transmission shift through the cable 24. Attention is invited to a comparison between Figs. 5 and 6. It will be noted that the levers 22 and 27 are identical except for their control pin positioning slots. The marked difference in the positions of the rocker member 56 may also be noticed in this comparison.

Referring once more to lever 22 in Fig. 5, the slot 80 has camming surfaces on each side and one of these surfaces or the other will engage the control pin 64 and guide it into the seat 82 depending on which transmission shift position the rocker member 56 is in when the lever 22 is depressed. Similarly, the slots in the other levers 23, 25 and 27 have camming surfaces which perform the same function. For example, when the rocker member 56 is moved from its position in Fig. 5 to its position in Fig. 6 by the depression of lever 27, the cam surface 90 of the slot in the lever 27 engages the control pin 64 and guides it into the seat 182 to thereby rotate the rocker member 56 and effect a gear shift.

To effect latching of each lever when it is to be applied, the apparatus is provided with a latching plate 92 which is pivotally mounted between the walls 60 and 62 of the box 20. The pivotal mounting takes the form of a pin 94 which extends through side flanges 96 and 98 of the plate 92. The plate 92 is biased clockwise as viewed in Figs. 5 and 6 by a coil spring 100 which is connected between the bottom of the plate 92 and the bottom of the extension 54. In cooperation with the plate each of the levers are provided at their rear ends with humps as, for example, 101 and 102 on levers 22 and 23, respectively, shown in Fig. 5. The hump 101 on lever 22 is provided with an upper abutment 103 and a lower abutment 104. The lower abutment 104 engages the upper edge of the plate 92 to hold the lever 22 in its depressed or applied position. If the lever 23 were depressed the upper abutment 105 of the hump 102 on lever 23 would initially engage the plate 92 rotating the same out of engagement with the lower abutment 104 of the lever 22 to thereby release the lever 22 which is returned to its unapplied position by the spring 122. Thereafter the lever 23 is further moved to its applied position and is held there in the same manner as lever 22 is held in place in Fig. 5. It will be understood that the other levers 25 and 27 are similarly provided with latching abutments which function in the same manner as described relative to levers 22 and 23.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. Control apparatus for a vehicle transmission including a housing, a plurality of lever members pivotally mounted in said housing and movable from inactive positions to applied positions and from applied positions to inactive positions, means yieldably urging said lever members toward their inactive positions, rocker means pivotally carried by said housing including a control pin spaced from the pivotal axis of said rocker means, means operably connected to said control pin and adapted to be connected to said transmission, each of said lever members having slots provided with camming surfaces adapted to engage said control pin to rotate said rocker means to different predetermined positions and each lever having a substantially arcuate surface with stop means thereon, and means cooperatively engageable with the stop means on said lever members for holding each lever member in its applied position.

2. Control apparatus for a transmission including a housing, a plurality of lever members pivotally mounted in said housing and movable from inactive positions to applied positions and from applied positions to inactive positions, means yieldably urging said lever members toward their inactive positions, rocker means pivotally carried by said housing including a member spaced from the pivotal axis of said rocker means, means operably connected to said rocker means and adapted to be connected to said transmission, each of said lever members having a camming surface adapted to engage the member of said rocker means to rotate said rocker means to different predetermined positions, and a pivotally mounted latching member engageable with said lever members for holding each lever member in its applied position, each of said lever members having holding means and releasing means engageable with said latching member.

3. Control apparatus adapted for use with a vehicle provided with a transmission having a control member which is selectively movable to a plurality of positions to establish respectively different driving ranges of the transmission, said control apparatus comprising a device adapted to be located within the reach of the operator of the vehicle and including a housing, a plurality of levers pivotally mounted in said housing and movable from inactive positions to applied positions and from applied positions to inactive positions, means yieldably urging said levers into their inactive positions, rocker means pivotally carried by said housing including a transverse portion spaced from and extending substantially parallel to the axis of said rocker means, means adapted to operably connect said rocker means and said transmission control member to facilitate the selection of one of the driving ranges of said transmission, each of said lever members having an abutment adapted to engage said transverse portion of said rocker means to rotate said rocker means to different predetermined positions, and pivotally mounted means carried by said housing and operatively engageable with said levers for holding each lever in an applied position.

4. A control device for a vehicle transmission comprising a housing adapted to be mounted within the reach of the operator of the vehicle, a plurality of levers pivotally mounted within the housing and movable from inactive positions to active positions, a rocker member pivotally mounted within the housing, cable means having one end connected to said rocker member and its other end adapted for connection to said transmission, each of said levers having portions extending from their pivotal connection outwardly of said housing for manual manipulation by the operator and each having another portion extending in the opposite direction from their pivotal connection having camming surfaces engageable with said rocker member for moving said rocker member to a position different from the other levers, means operatively connected between said housing and levers for urging the latter into their inactive positions, and pivotally mounted latch means carried by said housing and engageable with said levers for holding the latter in their applied positions.

5. In operating mechanism for a control element having a plurality of positions, a plurality of selectively operable pivotally mounted levers each adapted upon its pivotal movement to selectively move said control element to a predetermined position different from the position imparted by pivotal movement of other levers, each of said levers having arcuate cam surfaces with stop means thereon, and means engageable with said stop means for holding each lever in a pivoted position.

6. In an operating mechanism for a control element having a plurality of positions, a member mounted for oscillatory movement and adapted to be connected to said control element, a plurality of pivotally mounted levers each adapted upon its pivotal movement to selectively oscillate said member to a predetermined degree different from the degree of oscillating imparted by actuation of other levers, each of said levers being manually operable at one end and having a camming surface at its opposite end with stop means thereon, and means engageable with the stop means on each lever for holding each lever in a pivoted position.

References Cited in the file of this patent

UNITED STATES PATENTS

| | | |
|---|---|---|
| 1,072,439 | Duryea | Sept. 9, 1913 |
| 2,014,358 | Miller | Sept. 10, 1935 |
| 2,196,433 | Allison | Apr. 9, 1940 |
| 2,214,785 | Wells | Sept. 17, 1940 |
| 2,236,640 | Hanson | Apr. 1, 1941 |
| 2,252,273 | Price et al. | Aug. 12, 1941 |
| 2,307,619 | Brewer | Jan. 5, 1943 |
| 2,451,150 | Brian | Oct. 12, 1948 |